United States Patent
Terada et al.

(10) Patent No.: US 8,512,845 B2
(45) Date of Patent: Aug. 20, 2013

(54) MOLDED MALE SURFACE FASTENER

(75) Inventors: Mineto Terada, Toyama (JP); Shinichi Imai, Toyama (JP); Kenji Okuda, Toyama (JP)

(73) Assignee: YKK Corporation (JP)

( * ) Notice: Subject to any disclaimer, the term of this patent is extended or adjusted under 35 U.S.C. 154(b) by 195 days.

(21) Appl. No.: 13/124,879

(22) PCT Filed: Nov. 6, 2008

(86) PCT No.: PCT/JP2008/070207
§ 371 (c)(1),
(2), (4) Date: Apr. 19, 2011

(87) PCT Pub. No.: WO2010/052779
PCT Pub. Date: May 14, 2010

(65) Prior Publication Data
US 2011/0197404 A1    Aug. 18, 2011

(51) Int. Cl.
*A44B 18/00* (2006.01)
(52) U.S. Cl.
USPC .............. 428/100; 428/99; 428/119; 428/120
(58) Field of Classification Search
USPC .............. 428/99, 100, 119, 120, 900; 24/442
See application file for complete search history.

(56) References Cited

U.S. PATENT DOCUMENTS

| | | | |
|---|---|---|---|
| 6,468,624 B1 | 10/2002 | Fujisawa et al. | |
| 6,939,596 B2 | 9/2005 | Coronel et al. | |
| 7,431,976 B2 * | 10/2008 | Hermann et al. | 428/100 |
| 2002/0164449 A1 | 11/2002 | Fujisawa et al. | |
| 2004/0258878 A1 | 12/2004 | Coronel et al. | |
| 2005/0160534 A1 | 7/2005 | Akeno et al. | |

FOREIGN PATENT DOCUMENTS

| | | |
|---|---|---|
| EP | 1208761 | 5/2002 |
| EP | 1452106 A1 | 9/2004 |
| GB | 2410528 A | 8/2005 |
| JP | 2002-177019 A | 6/2002 |
| JP | 2000-516485 A | 12/2002 |
| JP | 2005-211198 A | 8/2005 |
| WO | 03/030672 A1 | 4/2003 |

OTHER PUBLICATIONS

International Search Report and Written Opinion, PCT International Patent Application No. PCT/JP2008/070207 mailed Feb. 10, 2009.

* cited by examiner

*Primary Examiner* — Alexander Thomas
(74) *Attorney, Agent, or Firm* — Kilpatrick, Townsend & Stockton LLP

(57) ABSTRACT

A molded male surface fastener includes resin invasion preventing walls, which prevent an invasion of a molding foamable resin material of a cushion body, on right and left edge portions along a longitudinal direction of a surface of a flat base member made of a thermoplastic resin, a plurality of engaging elements provided between left and right resin invasion preventing walls, and a linear sealing body that is continuously disposed in the longitudinal direction of the base member along a peripheral portion of a top portion of each resin invasion preventing wall. When an engaging element forming surface of the surface fastener is placed on a concavo-convex surface of foaming body molding cavities of a foaming mold, if the mold has the same magnetic force as that in the related art, the linear sealing body is well adhered along the concavo-convex surface.

13 Claims, 18 Drawing Sheets

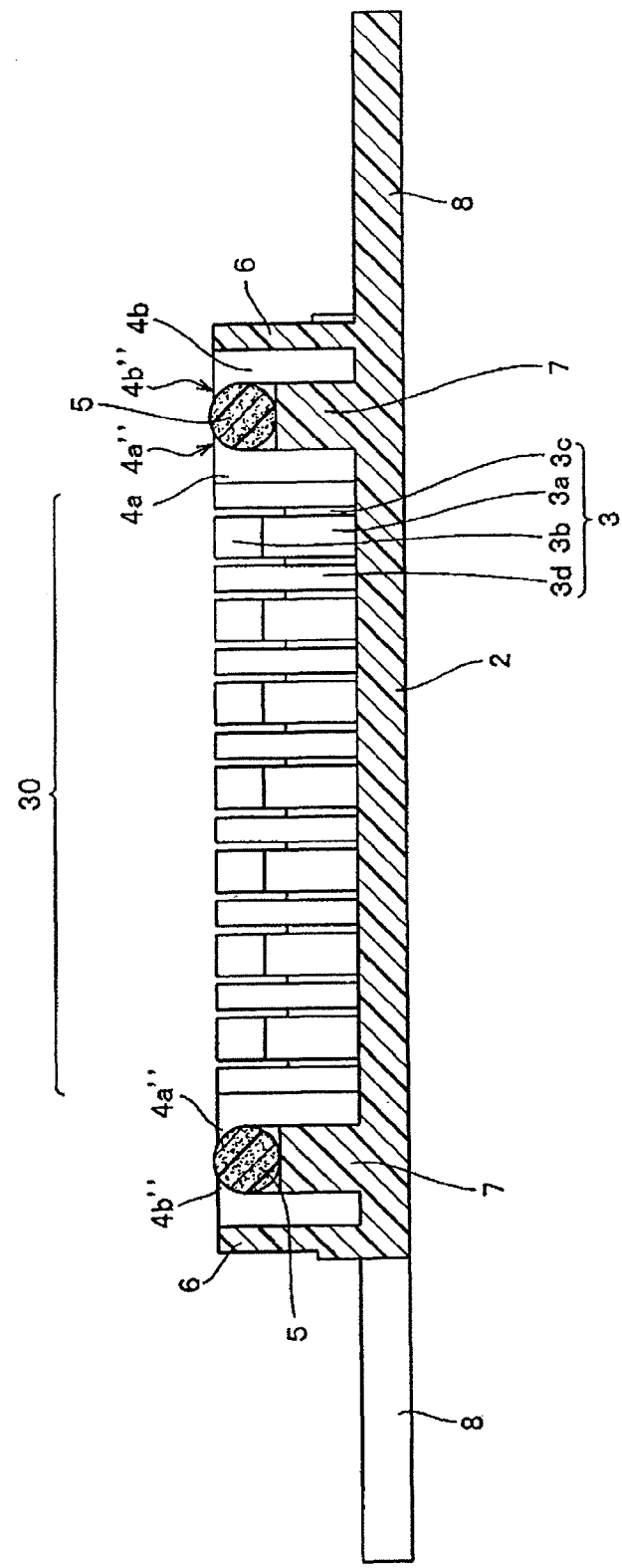

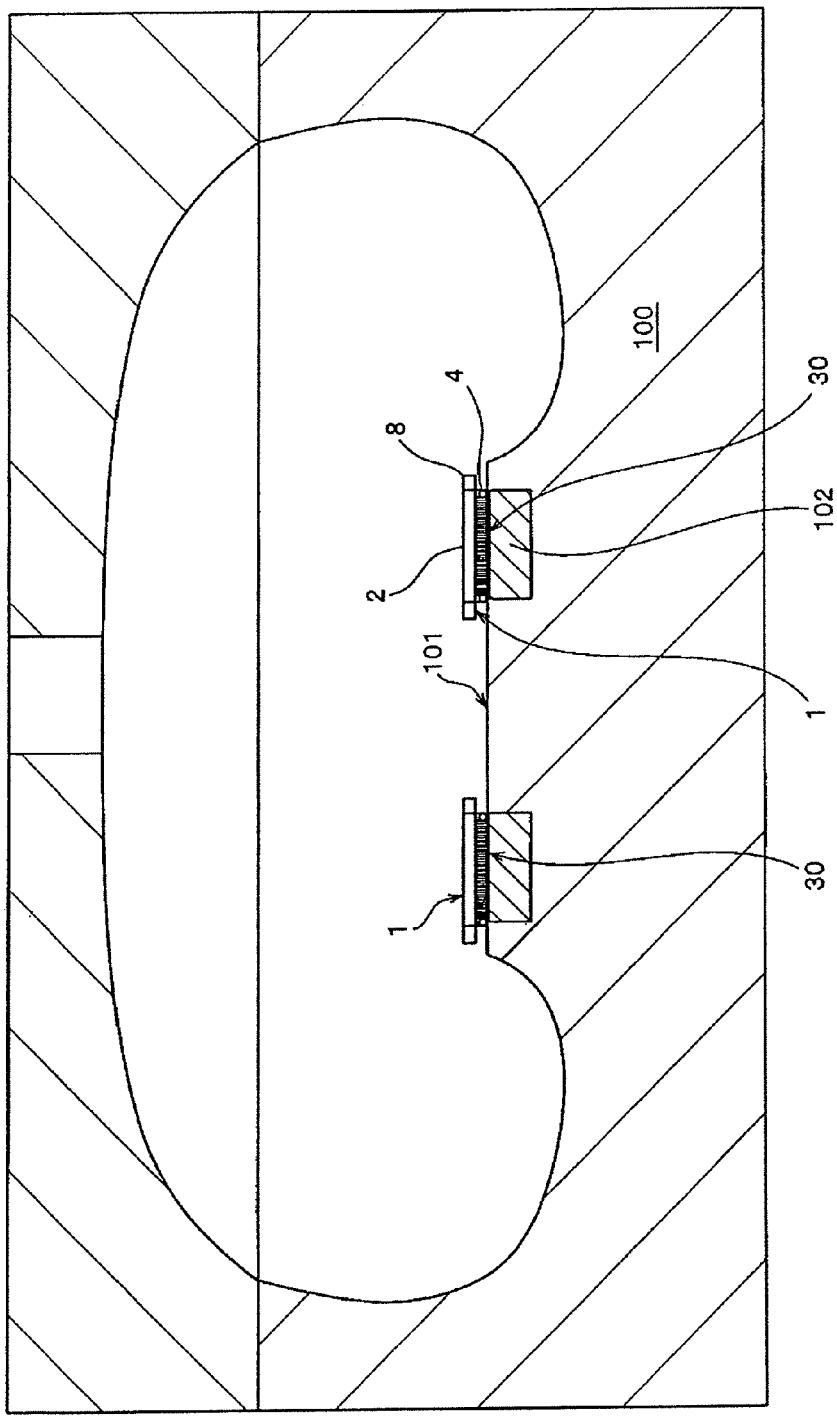

MOLDED MALE SURFACE FASTENER

This application is a national stage application of PCT/JP2008/070207, which is incorporated herein by reference.

TECHNICAL FIELD

The present invention relates to a surface fastener that includes male engaging elements composed of plural hook pieces or mushroom pieces which engage with mating loop-like female engaging elements on one surface of a flat base member and resin invasion preventing walls which are disposed along left and right edge portions in a longitudinal direction of the base member and prevent an invasion of a foamable resin material into a male engaging element forming region when a production made of a foamable resin is foam-molded.

BACKGROUND ART

Seat sheets of automobiles or trains, and various kinds of sofas and office chairs have a cushion body inside their surface skin materials. As this cushion body, so-called rock wool, which is obtained by entangling stiff fibers such as palms, and hemp or thick synthetic fibers and hardening with rubber or the like, or foamable molded bodies made of various kinds of foamable resin materials are used. These cushion materials have a curved surface composed of concavo-convex shapes satisfying human engineering factors in order to maintain a seating posture which provides no fatigue despite a long-hour seating. If it is intended to effectively manufacture the cushion materials having such a complicated surface shape in large quantities considering its cushion performance, the above-described rock wool that requires a number of manufacturing processes cannot meet the demand. Meanwhile, cushion bodies of foamable resin have been used widely because it can be manufactured by a single process and diversified shapes can be easily obtained. That is, the cushion body of foamable resin is molded into a desired shape at the same time when a foaming is induced by pouring a foamable resin material such as foamable urethane resin into a mold.

Various kinds of fiber cloth or natural or synthetic leather surface skin material are applied to and integrated with the surface of the cushion body formed in this way. For this integration, there is employed a means in which a foamable resin material is poured into a mold with a surface skin material adsorbed along a mold surface so as to integrate a cushion body with a rear surface of the surface skin material at the same time as molding is executed, or a means in which, after the cushion body is formed of a foamable resin material with a mold, the surface skin material is applied to its surface and fixed thereto.

According to the above means of an integral molding, when the surface skin material is set along an inner surface of the mold, it is adsorbed along the inner surface of the mold by means of adsorption means. When the surface skin material is deformed following a surface of a cushion body having a complicated surface configuration, the surface skin material needs to be itself of material having an excellent potential to be stretched. Therefore, since there is a limit to be stretched depending on a material, many wrinkles are likely to occur particularly between a seating surface and a peripheral side surface and up to now, great efforts have been made to remedy this phenomenon.

Further, since this integral molding integrates the cushion body and the surface skin material over their entire surfaces, if a strong force is applied in a direction in which the surface skin material deflects on the surface of the cushion body during actual usage, a shearing force is generated between the surface skin material and the cushion body, the cushion body is often partially torn and then, the surface skin material is separated. The material to be used as the surface skin material is automatically limited in order to exclude an occurrence of such wrinkles, and it is preferable to allow a slight motion between the surface skin material and the cushion body so that any excess force is not applied between them. For the reason, instead of integrating the surface skin material at the same time when the cushion body is molded, a method of applying the surface skin material onto a cushion body molded in advance has been increasingly used.

As described above, as a general method for integrating a molded male surface fastener at the time of molding the cushion body made of a foamable resin material, as illustrated in FIG. 5, an engaging element forming surface of a male surface fastener 1 is placed and fixed on a projecting surface portion 101 on a bottom surface of a mold 100 corresponding to a recess surface of a cushion body so that the engaging element forming surface is opposed to the projecting surface portion and then a foamable resin material is poured in the mold 100 so as to mold the cushion body in a foamed state while the male surface fastener 1 is buried in and integrated with the recess surface of the cushion body with the engaging element forming surface exposed outside. At a time of this foam molding, the foamable resin material needs to be prevented from flowing into a forming region of the male engaging elements. The surface skin material made of various kinds of materials such as pile woven/knit fabric, natural leather, and synthetic leather formed in a shape of a bag corresponding to an outer shape of the cushion body is applied to the cushion body molded by the above-described way. Then, loop-like female engaging elements disposed on a rear surface of the surface skin material are pressed against the engaging element forming surface of the male surface fastener 1 integrated with the cushion body so that the surface skin material is bonded and fixed along the recess surface of the cushion body and prevented from floating from the cushion body.

To prevent the foamable resin material from invading into the engaging element forming region of the male surface fastener when the cushion body is molded, plural technologies are suggested in Japanese Patent Laid-Open Publication No. 2000-516485 (Patent Document 1), U.S. Pat. No. 6,939, 596 (Patent Document 2), and Japanese Patent Laid-Open Publication No. 2005-211198 (Patent Document 3).

In Patent Document 1, plural male engaging elements are integrally molded and erected on one surface of a base tape and are coated by a synthetic resin cover to bury the male engaging elements disposed in a peripheral edge of a forming region of the male engaging elements, and an invasion preventing wall made of a foamable resin material is formed to surround the forming region of the male engaging elements. A resin of the same kind as the kind of synthetic resin cover may be filled or not filled into the synthetic resin cover. In order to increase adhesion with a foamable resin mold, particles made of magnetically attractable materials are contained in the resin materials constituting the synthetic resin cover or a magnetic attractable magnet is mixed.

In Patent Document 2, magnetically attractable particles are contained along the outside edge of an engaging element forming region of a molded male surface fastener where plural male engaging elements are integrally molded thereon, and anchor wire where plural fibers are attached to its peripheral surface is directly bonded and fixed to the surface of a flat base member through an adhesive to form a resin invasion preventing wall.

In Patent Document 3, in the male surface fastener, first resin invasion preventing walls that prevent an invasion of a foamable resin material for molding a cushion body extend to the left and right edge portions along a longitudinal direction of a long tape-like base member made of a thermoplastic resin material, plural male engaging elements are provided between the invasion preventing walls at the left and right sides, the male engaging elements are divided for required regions in a longitudinal direction of the base member, and second resin invasion preventing walls that extend in a widthwise direction of the base member are formed between division regions adjacent to each other in the longitudinal direction. The second resin invasion preventing wall extends in the widthwise direction of the surface of the base member, prevents the invasion of the foamable resin material for molding the cushion body to be invaded from the longitudinal direction of the base member, and has hook-like male engaging elements that engage with mating female engaging elements in an upper end portion of the second resin invasion preventing wall.

The second resin invasion preventing wall constitutes a lateral resin invasion preventing wall that continuously extends in a widthwise direction of the surface of the base member, has plural male engaging elements that extend in a forward-to-backward direction from the front and rear wall surfaces in a longitudinal direction of the base member at an upper portion of the lateral resin invasion preventing wall, prevents the lateral resin invasion preventing wall from invading the engaging element forming region made of the molding resin, complements a bonded portion omitted when the male engaging elements having engaging heads having the same shape as the engaging elements formed in the engaging element forming region are bonded to the female engaging elements of the rear surface of the surface skin material, and ensures a required bonding force. The molded male surface fastener that is integrally molded with the cushion body is integrally bonded to the cushion body by the outside region of the first and second invasion preventing walls and the rear surface of the base member. In order to ensure bonding strength between the cushion body and the surface fastener, when the surface fastener is molded, the rear surface is configured as a concavo-convex surface or non-woven cloth is integrated with the rear surface.

According to Patent Document 3, when the cushion body made of the foamable resin material is molded, in order to closely adhere the engaging element forming surface of the molded male surface fastener to the predetermined position of the mold, long magnetic line members are buried and integrated along a longitudinal direction of the base member in each of the portions of the base member of the left and right first resin preventing walls of the molded male surface fastener and the central portion of the base member in the widthwise direction. The magnetic line member is composed of a magnetically attractable line member or a linear magnet. As the magnetically attractable line member, a single metal or a mono-filament made of synthetic resin where particles made of magnetically attractable magnetic materials are mixed is mainly used. However, this line member has excellent flexibility.

Patent Document 1: Japanese Patent Laid-Open Publication No. 2000-516485
Patent Document 2: U.S. Pat. No. 6,939,596
Patent Document 3: Japanese Patent Laid-Open Publication No. 2005-211198

DISCLOSURE OF THE INVENTION

Problems to be Solved by the Invention

The male surface fastener that is disclosed in Patent Document 1 can be understood from the above-described structure. The male surface fastener is not continuously manufactured, and is individual manufactured as a single member through two or more processes for manufacturing a male surface fastener member and for molding a cover coating peripheral engaging elements of an engaging element forming region of the same male surface fastener member. When the male surface fastener member is a molded surface fastener, the surface fastener member is not continuously formed but individually molded. For this reason, in the male surface fastener that is disclosed in Patent Document 1, since the male surface fastener cannot be manufactured by a single process, a manufacturing cost is increased.

Meanwhile, in recent molded male surface fasteners including the male surface fasteners that are disclosed in Patent Documents 2 and 3, on a peripheral surface of a die wheel that is driven and rotated in one direction where cavities for molding plural engaging elements and cavities for molding invasion preventing walls made of a molded resin material are formed on a peripheral surface, a melting resin is continuously emitted or protruded, and the plurality of engaging elements and the invasion preventing walls are continuously molded and integrated with the surface of the tape-like base member. As a result, as compared with the male surface fastener that is disclosed in Patent Document 1, a manufacturing cost is greatly decreased.

Meanwhile, in automobile seats, as described above, in order to obtain the ergonomically most preferable seating posture, the concavo-convex surface that is made of an appropriately curved surface is formed in the seat surface. The shape of the concavo-convex surface, particularly, the length thereof is not constant but varied. The molded surface fastener is integrated with the same cushion body along a concave surface portion of the seating surface of the seat cushion body having the concavo-convex surface. When the cushion body is coated with a surface skin material, a female surface fastener region having female engaging elements of the rear surface of the surface skin member is pressed into the engaging element forming region of the surface fastener and bonded thereto, and the surface skin material is mounted in the cushion body with strain.

As such, in order to integrally mold the tape-like molded male surface fastener continuously molded in the cushion body to be curved along the concavo-convex surface of the cushion body having the different length, the tape-like molded male surface fastener needs to be closely adhered to a mold to be curved along the concavo-convex surface of the mold. For this reason, the molded male surface fastener needs to be easily curved. In the molded male surface fastener disclosed in Patent Document 3, the first resin invasion preventing walls formed along the right and left edge portions are not continuously formed but intermittently arranged in two or more rows in a zigzag shape. In addition, in order to secure an adhesion force with respect to the mold, the synthetic resin line member where the magnetically attractable material is mixed or the linear magnet is continuously buried in the portion of the base member side of the first resin invasion preventing wall and the central portion of the base member in the longitudinal direction of the base member.

By using the above-described configuration, when unevenness portions are small in the surface fastener absorbing surface of the mold and the surface fastener absorbing surface is almost a plane, the male surface fastener can be easily and accurately disposed at an arbitrary position on the mold. However, if the unevenness portions are large in the surface fastener absorbing surface of the mold, when unevenness portions of the curved surface are large, the floating may be generated from the mold at the male surface fastener, particularly, the end portion thereof. If the end portion of the molded male surface fastener floats from the mold, at the time of the following foam molding, the foamable resin material is invaded in a gap between the mold and the male surface fastener due to a foaming pressure, and passes the resin invasion preventing wall of the molded male surface fastener while gradually foaming the gap to be then invaded into the engaging element forming region, thereby causing a desired engaging force as the molded male surface fastener not to be realized. In the influence of the lag of the resin during the cooling when the molded male surface fastener is molded, unevenness or warpage is formed in a widthwise direction or a longitudinal direction of the molded male surface fastener, the resin is invaded into the gap between the mold and the molded male surface fastener due to the unevenness or the warpage, and the desired engaging force as the molded male surface fastener may not be realized.

The present invention has been made to solve the above-described problems, and it is an object of the present invention to a molded male surface fastener that is continuously molded in a tape shape, minimizes an invasion of a foamable resin material into an engaging element forming region even when surfaces of molding cavities of a mold for molding a cushion body have large unevenness shapes or unevenness or warpage of the molded male surface fastener exist, and secures a minimally required bonding force.

Means for Solving the Problems

The above object is achieved by the main configuration of the present invention, that is, a molded male surface fastener comprising resin invasion preventing walls, which prevent an invasion of a molding foamable resin material of a cushion body, on surfaces of right and left edge portions along a longitudinal direction of a flat base member having front and rear surfaces and made of a thermoplastic resin, a plurality of male engaging elements integrally provided on a surface of the flat base member between the left and right resin invasion preventing walls, and a magnetic material magnetically attracting or attracted and molded and integrated with the cushion body at the same time as a molding of the cushion body, being characterized in that a linear sealing body that is made of a material different from materials of the flat base member and the male engaging elements and has a sealing property is fixed and supported along a top surface of each of the left and right resin invasion preventing walls.

According to a preferable aspect, each of the resin invasion preventing walls comprises a first linear sealing body nipping portion and a second linear sealing body nipping portion that are integrated with the base member along the longitudinal direction of the base member and extend in parallel, and the linear sealing body extends along the longitudinal direction between peripheral portions of top portions of the first and second linear sealing body nipping portions. Preferably, linear sealing body comprises a material at least on a surface thereof, the material being more deformable and having flexibility more than that of the constituent materials of the flat base member and the male engaging elements. The linear sealing body is continuously exposed between the first and second linear sealing body nipping portions, and a height (H1) of an exposed surface of the linear sealing body from the surface of the base member is set to be equal to a height of the top surface of the male engaging element or higher than the height of the top thereof.

Preferably, the first and second linear sealing body nipping portions are intermittently disposed along the longitudinal direction of the base member. The molded male surface fastener may further comprise external walls that are intermittently disposed on the surface of the base member along an outside edge of the second linear sealing body nipping portion to close each gap formed in the longitudinal direction in the second linear sealing body nipping portion.

Preferably, the molded male surface fastener further comprises a linear magnetic body that contains a material magnetically attracting or attracted in a longitudinal direction of the molded male surface fastener. A linear sealing body support portion that supports the linear sealing body from a lower side can be disposed on the surface of the base member between first and second linear sealing body nipping portions to intermittently protrude in the longitudinal direction of the base member. Further, engaging portions that engage the linear sealing body with a top portion of each of the resin invasion preventing walls can be formed. The linear sealing body is a fiber string body. A synthetic resin line member that contains magnetic particles magnetically attracting or attracted or a metal line member may be disposed in a central portion of the fiber string body as a core member. Further, the linear sealing body may be formed of a porous resin material.

Effects of the Invention

According to the present invention, the linear sealing body is continuously disposed in a longitudinal direction at the peripheral portions of the top portions of the first and second linear sealing body nipping portions constituting the first resin invasion preventing wall distant separated apart from the base member. Even though the surface fastener has the same magnetic force as that in the related art, the linear sealing body can be closely adhered to the arrangement surface of the surface fastener of the mold for molding the cushion body using the magnetic absorbing force. Therefore, the strong sealing force can be maintained between the first resin invasion preventing wall of the male surface fastener that supports the linear sealing body and the mold for molding the foamable resin. For this reason, even when unevenness of the arrangement surface of the surface fastener of the mold or unevenness or warpage of the surface fastener is severe, the linear sealing body is adapted along the unevenness shape of the arrangement surface of the surface fastener of the mold for molding the foamable resin, the gap is not generated between the molded male surface fastener and the cavity surface of the mold, and the invasion of the foamable resin material can be effectively prevented.

When the linear sealing body is continuously exposed between the first and second linear sealing body nipping portions, the molded male surface fastener has a magnetic force. For this reason, the magnetic force is uniformly applied over the entire linear sealing body, and the linear sealing body can be securely adhered to the arrangement surface of the surface fastener of the mold. At this time, if the contact surface of the linear sealing body with the mold is formed of a material softer than the materials of the base member and the male engaging elements, when the sealing body is absorbed into the mold, the linear sealing body is elastically deformed due to the absorbing force, an adhesion area with the mold is increased, and a sealing property with respect to the foamable resin material is improved. In order to secure the sealing property, the height of the protrusion surface of the linear sealing body from the surface of the base member is set to be equal to the height of the top of the male engaging element or slightly higher than the top thereof.

Further, since the first and second linear sealing body nipping portions are intermittently disposed along the longitudinal direction of the base member, a flectional property of the molded male surface fastener in the longitudinal direction can be secured. In addition to the first and second linear sealing body nipping portions, the external walls that intermittently extend in the longitudinal direction of the base member are provided outside the second linear sealing body nipping portion. As a result, the foamable resin material can be effectively prevented from being invaded into the engaging element forming region of the molded male surface fastener when the foamable resin material is molded. The external walls that are intermittently disposed are differently disposed to cover the gaps formed in the second linear sealing body nipping portions that are intermittently disposed to be adjacent to the longitudinal direction of the base member, and invasion prevention of the foamable resin material is improved.

If the linear sealing body support portion that supports the linear sealing body from the lower side is protrusively disposed on the surface of the base member between the first and second linear sealing body nipping portions, in addition to nipping by the first and second linear sealing body nipping portions, the linear sealing body is securely supported from the lower side. Therefore, the linear sealing bodies of more than the required amount do not need to be prepared, and the height H1 of the protrusion surface of the linear sealing body from the surface of the base member can be set to be equal to the height of the top surface of the male engaging element or higher than the height of the top surface. Further, the relative movement between the linear sealing body and the molded male surface fastener is removed, the linear sealing body and the molded male surface fastener are integrally functioned, and the sealing property between the mold for molding the foamable resin and the cavity surface can be secured by the linear sealing body.

If the linear sealing body support portions are intermittently disposed in the longitudinal direction of the base member, a flectional property of the molded male surface fastener is secured, and the surface fastener can be adapted to unevenness of the arrangement surface of the surface fastener of the mold. The linear sealing body is preferably a continuous member to obtain a uniform absorption property with the mold. In particular, in the case of the synthetic resin line member that contains the magnetic particles composed of an alloy of iron, cobalt or nickel, it is preferable that the linear sealing body be the continuous member, because the desired flexibility is obtained. Even though the peripheral surface of the linear sealing body is covered by a fiber aggregate, a desired absorption property is obtained. The flexibility of the peripheral surface of the linear sealing body is increased and the sealing property is improved. Alternatively, even though the foamable resin body is used as the linear sealing body, the above-described effect is obtained. If the engaging portions that engage the linear sealing body with the top portions of the first and second linear sealing body nipping portions are provided, the linear sealing body is difficult to be deviated from the first and second linear sealing body nipping portions, and the linear sealing body is securely supported.

BRIEF DESCRIPTION OF THE DRAWINGS

FIG. 4 is a cross-sectional view taken along the line IV-IV of FIG. 2.

FIG. 5 is a diagram illustrating an example of an arrangement of a surface fastener in a mold before foam molding, when the molded surface male fastener is molded and integrated with a foamable product.

EXPLANATION OF REFERENCE NUMERALS

Figure 1:
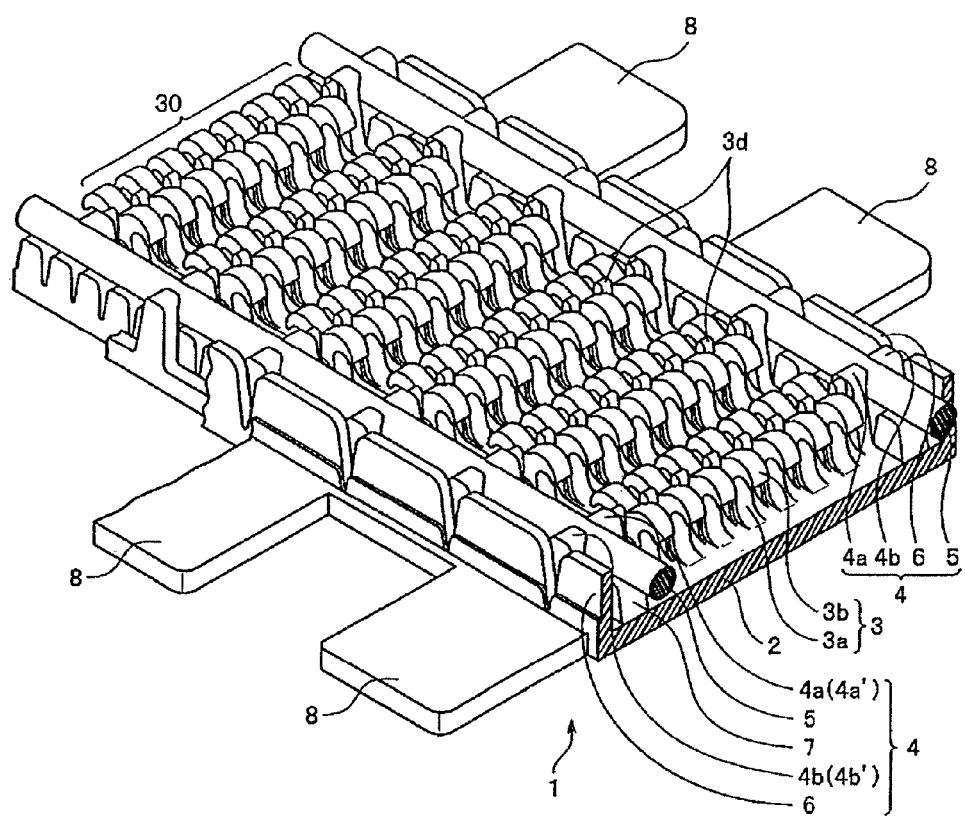
FIG. 1 is a partial perspective view illustrating a state where a molded male surface faster according to a first preferable embodiment of the present invention is partially broken, when viewed from an upper side.

1: Molded male surface fastener
2: Base member
2a: Concavo-convex surface
3: Engaging element
3a: Rising portion
3b: Engaging head
4, 14: Resin invasion preventing wall
4a to 4c: First to third linear sealing body nipping portion
4a', 4b': Nipping wall
4a" to 4c": Engaging portion
5: Linear sealing body
5': Fiber string body 6: External wall
7: Linear sealing body support portion (boss portion)
7a, 7b: First and second linear sealing body support portion (boss portion)
8: Fin piece
9: Adhesive layer
14: Resin invasion preventing wall
14a: First linear sealing body nipping portion
14b: Second linear sealing body nipping portion
15: Linear magnetic member
30: Engaging element forming region
100: Foaming mold
101: Projecting surface portion
102: Magnet
200: Polyurethane resin (foamable resin material)
300: Die wheel
301: Continuous extrusion nozzle
302: Male engaging element forming cavity
303: Pick-up roll
304, 305: Pair of upper and lower pressing roll

BEST MODE FOR CARRYING OUT THE INVENTION

Hereinafter, embodiments of the present invention will be described specifically with reference to the accompanying drawings. FIGS. 1 to 4 illustrate a first embodiment of the present invention.

As illustrated in FIG. 1, in a tape-like molded male surface fastener 1 (hereinafter, simply referred to as surface fastener) according to this embodiment, a plurality of hook-like male engaging elements 3 are molded in an engaging element forming region 30 other than edge portions on one surface of a base member 2 having a flat shape in a widthwise direction so as to be integrated with one surface of the base member 2, and resin invasion preventing walls 4 are erected on the left and right edge portions of the base member 2 along a longitudinal direction such that they are linearly extended. In this embodiment, each of the resin invasion preventing walls 4 has first and second linear sealing body nipping portions 4a and 4b that are disposed in the left and right edge portions adjacent to the engaging element forming region, such that they are disposed at predetermined intervals to be parallel to the longitudinal direction, an external wall 6 that is disposed to be closely adhered to the side of the second linear sealing body nipping portion 4b opposite to the engaging element forming region, and a linear sealing body support portion 7 that is disposed in the first and second linear sealing body nipping portions 4a and 4b and downward supports a linear sealing body 5 protruding from the surface of the base member 2.

In this case, as a formation material of the surface fastener, a thermoplastic resin, such as a polyamide resin, a polyester resin, a polypropylene resin, PVC, an ABS resin, a polyethylene resin, and a polystyrene resin, is used. The male engaging element 3 means a mushroom shape or a tree shape, in addition to the hook shape, which can be engaged with a mating loop-like female engaging element. The male engaging elements 3 include male engaging elements of all shapes that are known from the past.

The first and second linear sealing body nipping portions 4a and 4b, the external wall 6, and the linear sealing body support portion 7 are divided in the longitudinal direction of the base member 2 and intermittently formed. Each of nipping walls 4a' and 4b' that divide the first and second linear sealing body nipping portions 4a and 4b among them is composed of a block piece having an angle shape that is narrowed upward, as illustrated in FIG. 3D. The nipping walls are disposed adjacent to each other at a gap in a widthwise direction of the base member 2. As illustrated in FIGS. 1, 2, 3E, and 4, the external walls 6 are intermittently formed in the longitudinal direction in a cohesive state to close the gap between the nipping walls 4b' of the second linear sealing body nipping portions 4b disposed on the side opposite to the engaging element forming region 30, in the first and second linear sealing body nipping portions 4a and 4b that are intermittently disposed in the longitudinal direction in the left and right edge portions of the base member 2.

Figure 2:
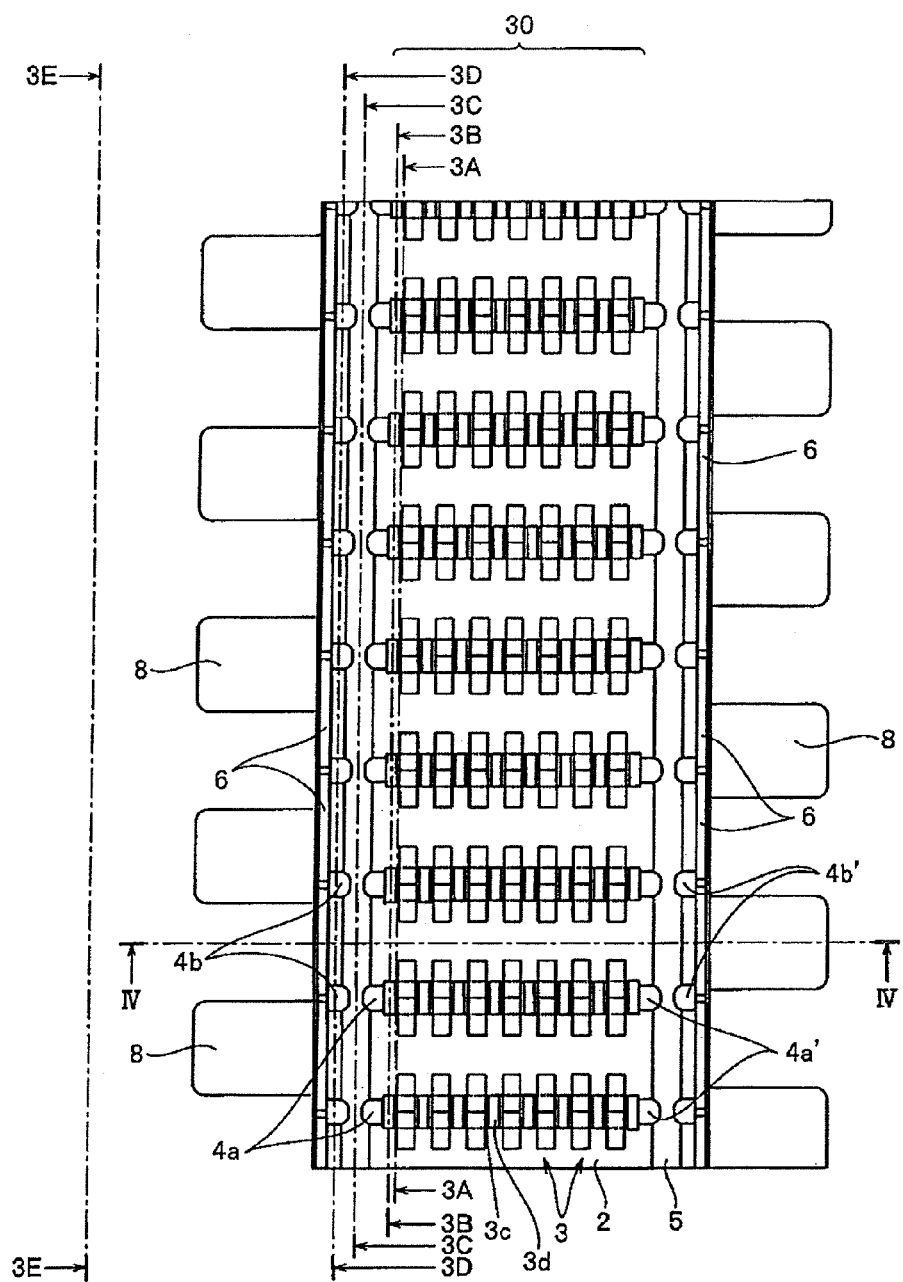
FIG. 2 is a top view illustrating the molded male surface fastener.
Figure 3A:
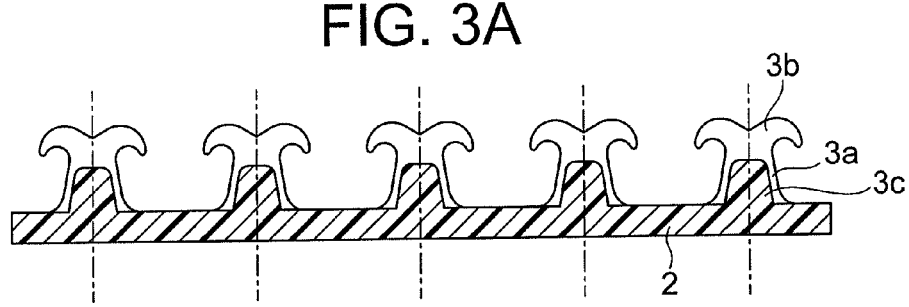
FIGS. 3A to 3E are cross-sectional views taken along the lines 3A-3A to 3E-3E of FIG. 2.
Figure 3B:
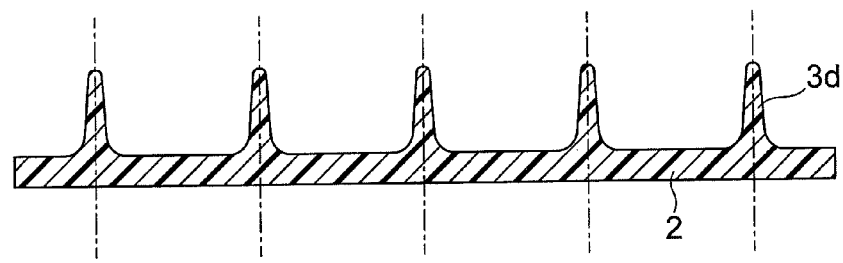
Figure 3C:
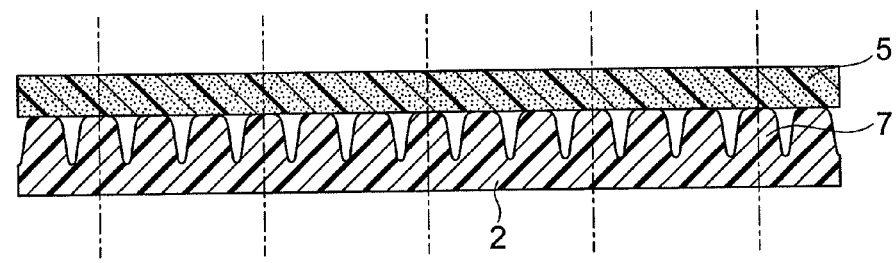
Figure 3D:
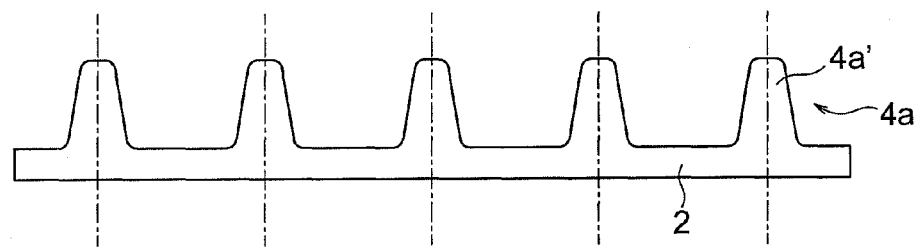
Figure 3E:
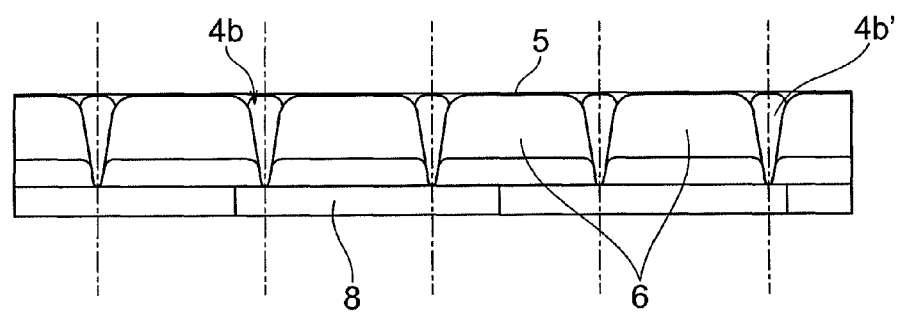

As illustrated in FIGS. 1, 2, and 3C, the linear sealing body support portion 7 is composed of short block pieces that are intermittently disposed to close the gap of the nipping walls 4a' and 4b' in the longitudinal direction, between the first and second linear sealing body nipping portions 4a and 4b. The linear sealing body support portion 7 is protruded to the surface of the base member 2, in a state where a portion thereof is cohesive to the facing surfaces of the nipping walls 4a' and 4b' of the first and second linear sealing body nipping portions 4a and 4b.

As illustrated in FIGS. 1, 3A, and 3B, the engaging elements 3 according to this embodiment are erected at predetermined pitches in a longitudinal direction and a widthwise direction. Each engaging element 3 has a rising portion 3a that vertically rises from the surface of the base member 2 and an engaging head 3b with a hook shape that is curved in forward and backward directions of the longitudinal direction of the base member 2 in the upper end of the rising portion 3a. At the left and right sides of the rising portion 3a in the widthwise direction of the base member, low first ribs 3c is formed, and at the sides of the engaging elements adjacent to the first ribs 3c, second ribs 3d that have a small width in the longitudinal direction of the base member and have the height equal to the top of the engaging head 3b. The first ribs 3c and the second ribs 3d are integrally molded with the engaging elements 3. Among the engaging elements 3 that are disposed in the widthwise direction of the base member 2, the outside surfaces of the second ribs 3d of the engaging elements 3 that are disposed at the positions closest to the left and right edge portions of the base member 2 are integrally coupled to the inside surface of the first linear sealing body nipping portion 4a.

In this embodiment, a foamable resin invasion preventing means from the widthwise direction of the surface fastener 1 is the resin invasion preventing wall 4. The foamable resin that is to be invaded from the longitudinal direction prevents an invasion by the rising portion 3a, the engaging head 3b, the first rib 3c, and the second rib 3d constituting the engaging element 3. The gaps are formed between the engaging portion 3 and the first and second ribs 3c and 3d. Since the gap is a narrow gap through which the foamable resin cannot pass, the resin cannot be invaded in the inside hook forming surface.

According to this embodiment, as illustrated in FIG. 4, the linear sealing body 5 is inserted into a space portion that is located at the top portion side of the first and second linear sealing body nipping portions 4a and 4b or the engaging element 3 rather than the surface of the base member 2 and formed between the first and second linear sealing body nipping portions 4a and 4b and the top surface of the linear sealing body support portion 7. The linear sealing body 5 is made of a material that has deformation and flexibility more than the materials of the base member 2, the engaging element 3, and the resin invasion preventing wall 4. In this embodiment, the linear sealing body 5 has sealing performance, and is made of a magnetically attracting or magnetically attracted material. For example, various elastomers where magnetic particles composed of alloys of iron, cobalt, and nickel are mixed, mono-filaments such as rubber, elastomer using a metal twisted thread obtained by binding and twisting a bundle of thin metal lines as a core member, and a line member composed of rubber are used. The linear sealing body 5 is preferably made of a material softer than the material constituting the base member 2 and the engaging element 3, because of a reason to be descried below. In this case, the soft material indicates a material that has a larger deformation amount than the base member 2 and the engaging element 3 when an external force is applied, that is, a material where a measurement value based on a durometer hardness test is lower than measurement values of the base member 2 and the engaging element 3.

As illustrated in FIG. 4, in the upper end portion of the first and second linear sealing body nipping portions 4a and 4b, engaging portions 4a" and 4b" with ⅙ circular arc-like sections that engage and support the upper peripheral surface of the linear sealing body 5 from left and right sides are formed in the upper end portions of the first and second linear sealing body nipping portions 4a and 4b. A method of forming the engaging portions 4a" and 4b" is described below. By forming the engaging portions 4a" and 4b", the linear sealing body 5 is nipped and supported between the first and second linear sealing body nipping portions 4a and 4b and the linear sealing body support portion 7.

In this embodiment, a plurality of fin pieces 8 are provided to extend on the same plane as the base member 2 at predetermined pitches along the left and right sides of the base member 2 of the surface fastener 1. The left and right fin pieces 8 are disposed in a zigzag shape. The fin pieces 8 are buried in a foaming body at the time of molding, and provided to firmly fix the surface fastener 1 to the foaming body. Instead of the fin pins 8, similar to the related art, non-woven cloth or foamable material having a plurality of loops can be integrally formed in the rear surface of the side opposite to the engaging element forming surface of the base member 2. Since the surface fastener can be molded by a single process, the fin pieces 8 are used in this embodiment.

Figure 6:
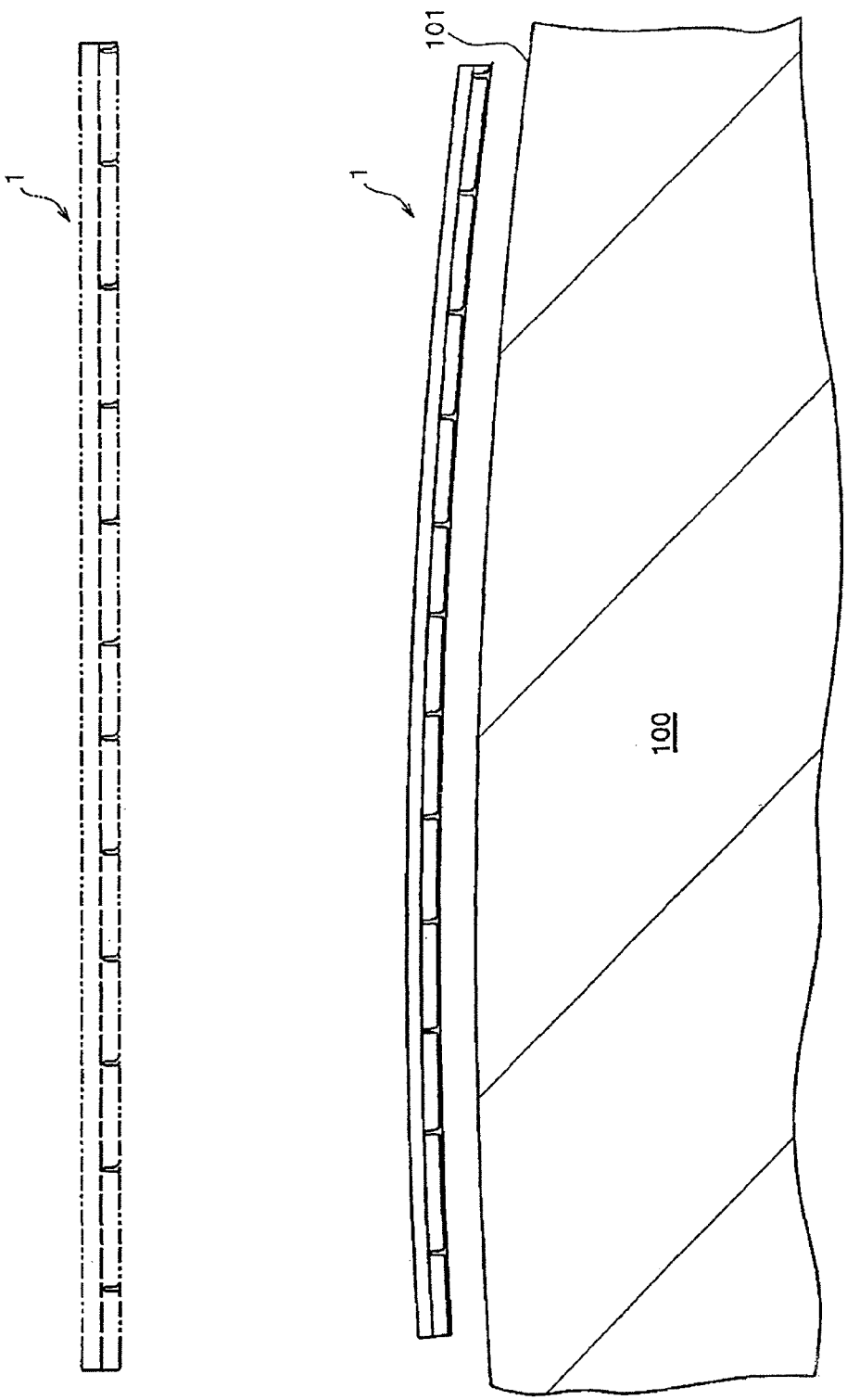
FIG. 6 is a state view of when the molded male surface fastener is closely adhered to a mold having a curved surface.

The surface fastener 1 according to this embodiment that has the above-described configuration is as illustrated in FIG. 5. At the time of molding the foaming body such as the cushion body (not illustrated) made of the foamable resin material, the engaging element forming surface is disposed to face the inner surface of the mold, at the predetermined position of the inner surface of the foaming body molding cavity of the foaming mold 100. The predetermined position of the inner surface of the cavity where the surface fastener 1 is disposed is a projecting surface portion 101 that is a convex-like curved surface of the bottom surface of the mold that corresponds to a recess constituting a seat surface of the cushion body to be molded. As such, when the arrangement surface of the surface fastener 1 is the projecting surface portion 101, the surface fastener 1 having the flat shape indicated by a virtual line in FIG. 6 is placed and fixed along the curved surface of the projecting surface portion 101, and a contacting force with respect to the foaming mold 100 in the surface fastener 1 is not applied, the surface fastener 1 may float from the foaming mold 100 in the end portion of the curved surface direction, due to an elastic force of the base member 2. If the portion of the surface fastener 1 floats from the foaming mold 100, even though the resin invasion preventing wall is formed in the peripheral edge of the surface fastener 1, the resin invasion preventing wall also floats from the foaming mold 100, the foamable resin invades through the gap with the mold, almost the entire engaging element forming region 30 is covered by the foamable resin, and the function as the engaging element in the surface fastener is lost.

In the surface fasteners that are disclosed in Patent Documents 2 and 3, similar to this embodiment, since the linear magnetic body is disposed to extend in the longitudinal direction of the base member, the entire surface fastener can be absorbed to the mold. However, since the linear magnetic body is apart from the absorbing surface of the foaming mold 100 and the surface fastener has an elastic repelling force, the end portion of the surface fastener may easily float from the mold in the end portion having the weak absorbing force. When the foaming body is molded, the foamable resin may be invaded into the engaging element forming region, which may result in lowering the engaging force. When the surface fastener is disposed in the mold, the arrangement position is shifted in a lateral direction due to a slight external force, and the surface fastener 1 is not surely integrated at the predetermined position of the cushion body after the surface fastener 1 is molded. For this reason, a surface skin body (not illustrated) cannot be beautifully covered along the concavo-convex surface of the cushion body. In general, a magnet 102 having a flat shape is buried at the arrangement position of the surface fastener of the foaming mold 100.

In the surface fastener 1 according to this embodiment, since the linear sealing body 5 is disposed one the upper end of the resin invasion preventing wall 4, that is, at a position approached to the magnetic absorbing surface of the foaming mold 100, in the linear sealing body 5 that has the same magnetic force as that of the linear magnet disclosed in Patent document 3, the strong magnetic force is applied, and the absorbing force is increased. For this reason, the adhesion force with respect to the foaming mold 100 is increased. As illustrated in FIG. 6, even though the seal performance is determined and the seat surface of the cushion body is significantly curved, the surface fastener is equally adhered along the curved surface, and the arrangement position is varied or the end portion of the surface fastener 1 does not float from the mold. The seal performance between the surface fastener 1 and the foaming mold 100 is greatly improved.

In the surface fastener 1 according to this embodiment, since the engaging element 3 having the above configuration and the first and second linear sealing body nipping portions 4a and 4b, the external wall 6, and the linear sealing body support portion 7 constituting the resin invasion preventing wall 4 are formed to be closely adhered to each other, the plurality of engaging elements 3 each including the first and second ribs 3c and 3d and the substantial resin invasion preventing walls using the first and second linear sealing body nipping portions 4a and 4b, the external wall 6, and the linear sealing body support portion 7 are formed in plural rows in the longitudinal direction of the surface fastener 1, and the substantial left and right resin invasion preventing mechanisms prevent the invasion of the foamable resin material from the widthwise direction of the surface fastener 1. Since all of the first and second linear sealing body nipping portions 4a and 4b, the external wall 6, and the linear sealing body support portion 7 are divided in the longitudinal direction, the surface fastener 1 that is made of a material having rigidity to some degree is easily curved in the longitudinal direction, and easily deformed according to the concavo-convex surface of the foaming mold 100. Similar to the surface fastener that is disclosed in Patent Document 3, plural lateral walls that partition the engaging element forming region in the longitudinal direction of the base member may be formed, and the engaging elements may be provided in the upper ends of the lateral walls. As the lateral wall structure, the wall that corresponds to the resin invasion preventing wall having the linear magnetic body may be provided.

Figure 7:
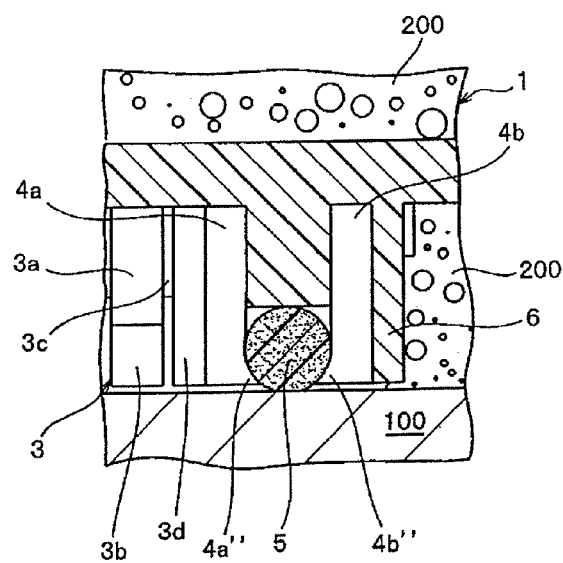
FIG. 7 is a schematic enlarged view illustrating a foamable resin invasion preventing mechanism when foam molding is performed using a foamable resin.

When the cushion is molded, as illustrated in FIG. 7, a foamable material that is injected into the foaming mold 100, for example, a polyurethane resin 200 is foamed in the mold and filled into the cavities. At this time, the surface fastener 1 is absorbed by a magnet (not illustrated) buried at a predetermined position of the foaming mold 100 and closely adhered. Meanwhile, a slight gap is formed between the absorbing surface of the mold and the second linear sealing body nipping portion 4b and the external wall 6 of the surface fastener 1 due to a foaming pressure of the polyurethane resin 200. According to this embodiment, as described above, since the absorbing force of the linear sealing body 5 to the foaming mold 100 is strong, the linear sealing body 5 is equally closely adhered to the foaming mold 100 over the entire length, and the linear sealing body 5 securely prevents the invasion of the foamable material that is invaded through the gap formed between the absorbing surface of the mold and the second linear sealing body nipping portion 4b and the external wall 6 of the surface fastener 1. Since the base member 2 has fin pieces 8, the surface fastener 1 can be firmly attached to the foamable molded product. In this case, the foamable molding material is not limited to the polyurethane. For example, the foamable molding material may be polystyrene, polyvinyl chloride, polyolefin, polyester, polyamide, and synthetic rubber.

Figure 8:
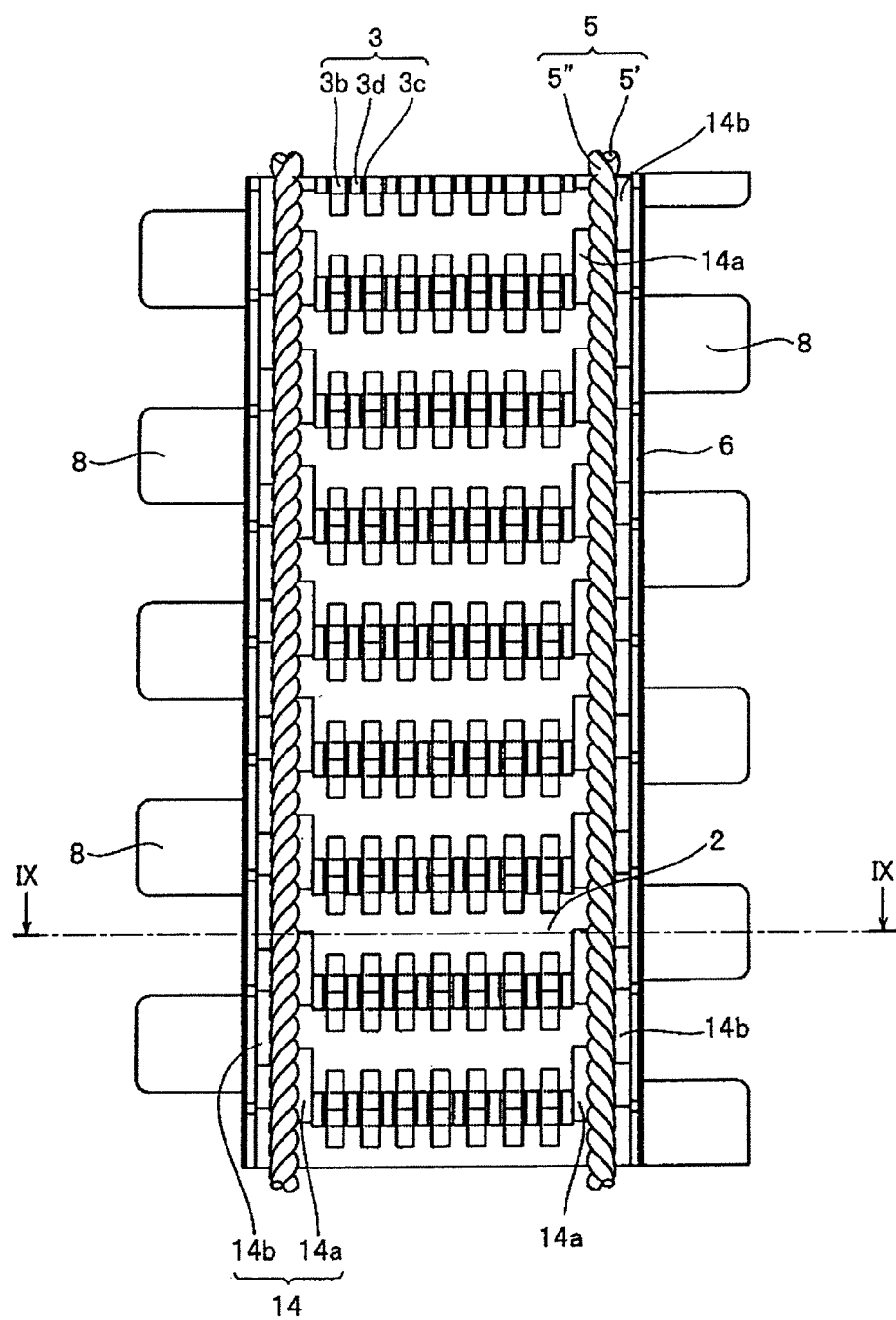
FIG. 8 is a top view illustrating a molded male surface fastener that is a modification of the first embodiment.

FIG. 8 illustrates a modification of the first embodiment. The modification is different from the first embodiment in that, in regards to the linear sealing body 5, instead of the linear sealing body made of elastomer where the magnetic particles are mixed or rubber, a twist string obtained by twisting a fiber string body 5' and a metal line member 5" is used. Instead of the twist string, a line member where a metal magnetic line member is used as a core member and the surface thereof is covered by the fiber twist string or a twisted thread can be used.

As a material of the string body, a natural fiber such as cotton, wool, silk or hemp, a chemical fiber such as polyesters, polyamides or celluloses, or a combination thereof may be used. For example, if a super absorbent polymer, such as "BELL OASIS (registered trademark) manufactured by Teijin or LAN SEAL (registered trademark) manufactured by Toyobo Co., Ltd., is used as fiber, absorption of a liquid foamable resin is increased, and resin invasion prevention performance is improved.

Figure 9:
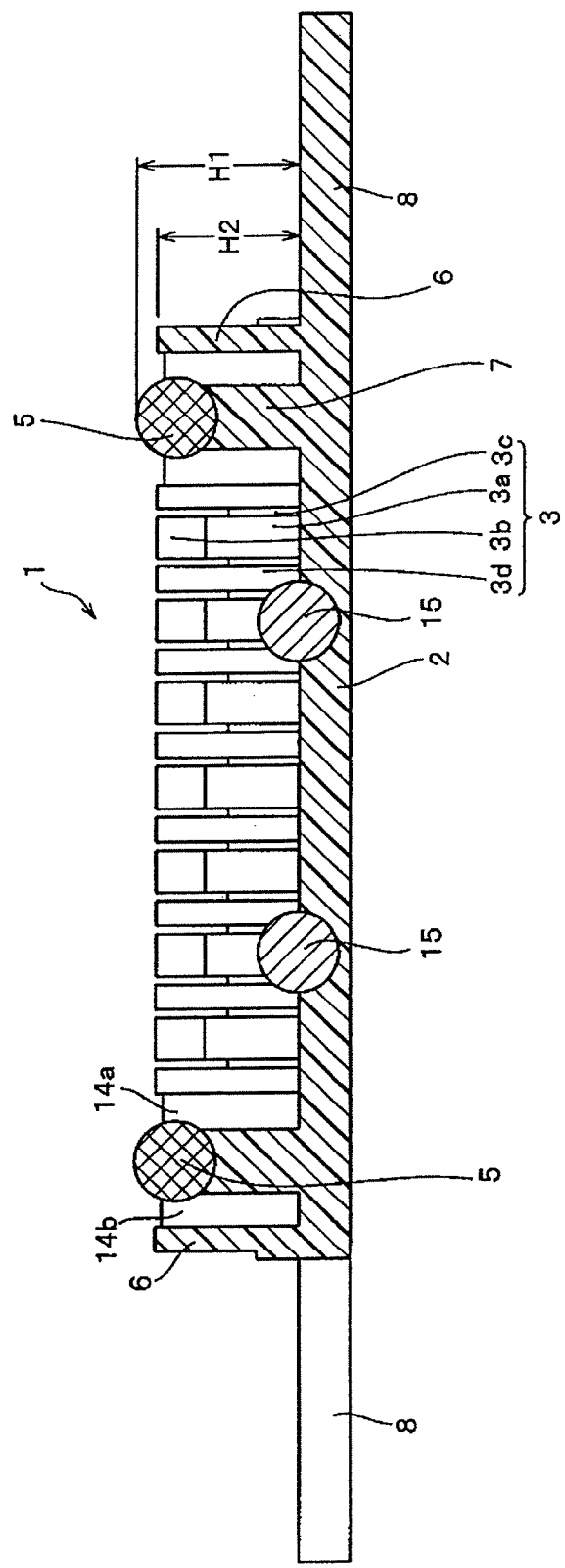
FIG. 9 is a cross-sectional view taken along the line IX-IX of FIG. 8.
Figure 10:
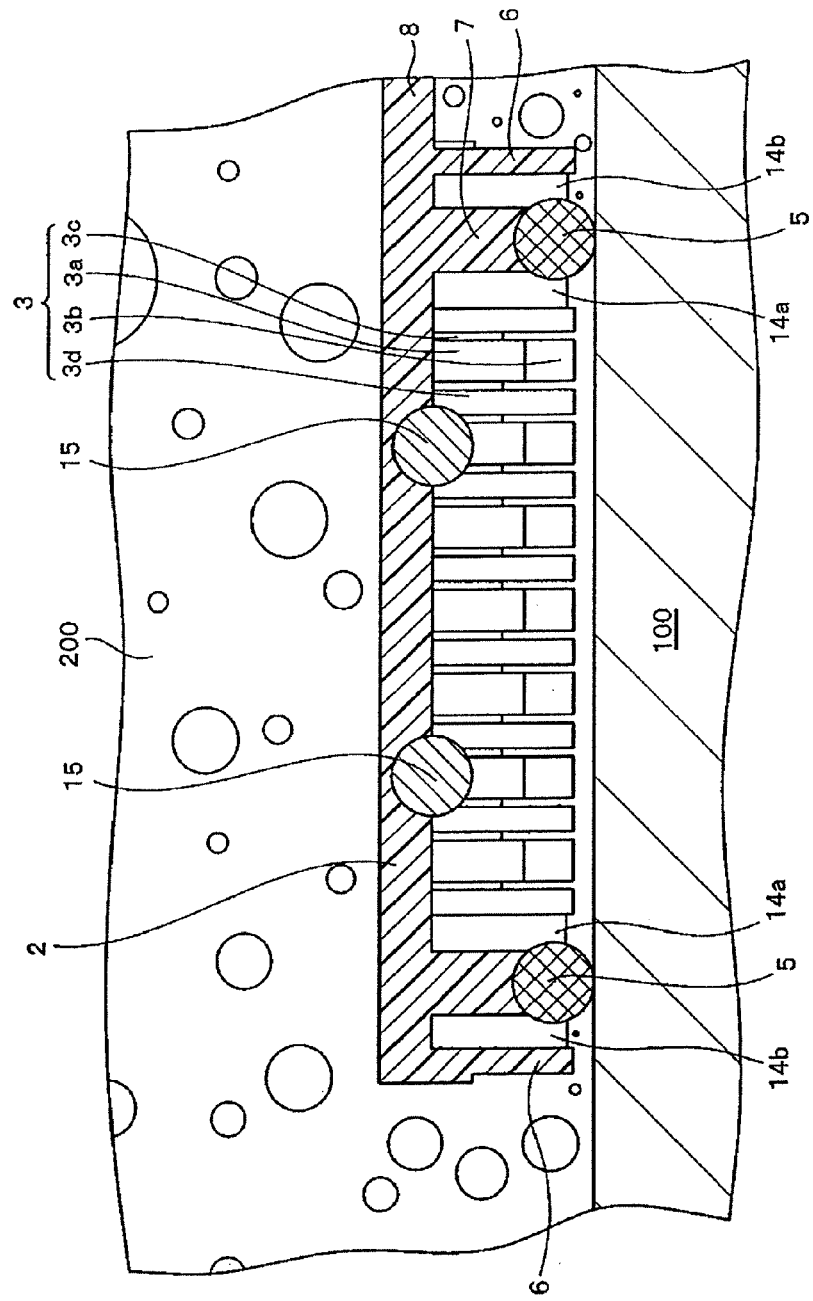
FIG. 10 is a schematic enlarged view illustrating a foamable resin invasion preventing mechanism when foam molding is performed using a foamable resin according to a second embodiment.

FIGS. 9 to 10 illustrate a second embodiment of the present invention. The second embodiment is different from the first embodiment in that the linear sealing body 5 is composed of a fiber twist string, and two linear magnetic members 15 are buried between the base member 2 and the engaging element 3 of the surface fastener 1 at an interval so as to be parallel to each other in the longitudinal direction. In this embodiment, although not illustrated, the linear sealing body 5 is not formed of a fiber string body, and the peripheral surface of the metal line member 5" may be used as the line sealing body that is covered by a material obtained by twisting the plurality of fiber string bodies 5', similar the modification of the first embodiment. In this case, the magnetic attraction force that is generated by the linear magnetic member 15 and the linear sealing body 5" buried in the base member 2 is increased, and an adhesion force with respect to the foaming mold 100 becomes strong.

Figure 11:
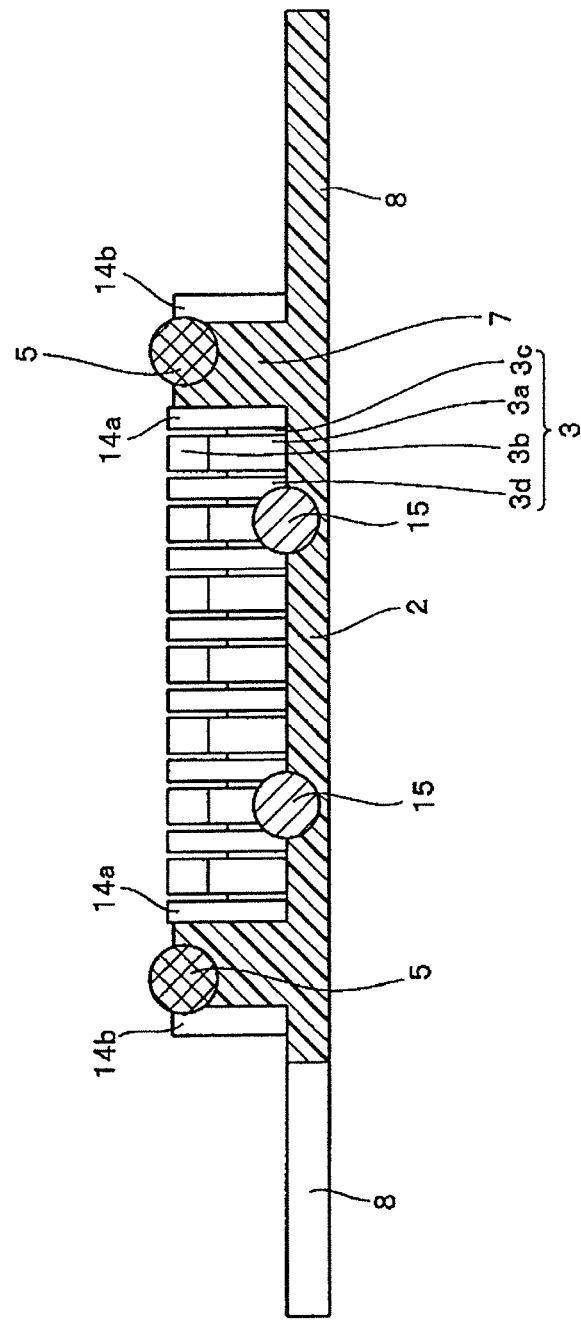
FIG. 11 is a lateral cross-sectional view illustrating a modification of the second embodiment.

As illustrated in FIG. 11, in the second embodiment, the external wall 6 is not provided, the linear sealing body support portion 7 that connects the first and second linear sealing body nipping portions 14a and 14b is provided, the height of the linear sealing body support portion 7 from the surface of the base member is set to be equal to the height of the first and second linear sealing body nipping portions 14a and 14b, the lower half portion of the linear sealing body 5 is buried by the top surface of the linear sealing body support portion 7, and the linear sealing body is nipped with the second linear sealing nipping portion 14b so as to be nipped and supported from the left and right sides and the lower side. However, the modification is different from the second embodiment in that the linear sealing body support portion 7 is continuous in the longitudinal direction of the base member 2 and the thickness in the widthwise direction is more than the thickness in the first embodiment. For this reason, in the description below, the same portions as those in the second embodiment are denoted by the same reference numerals.

Figure 12:
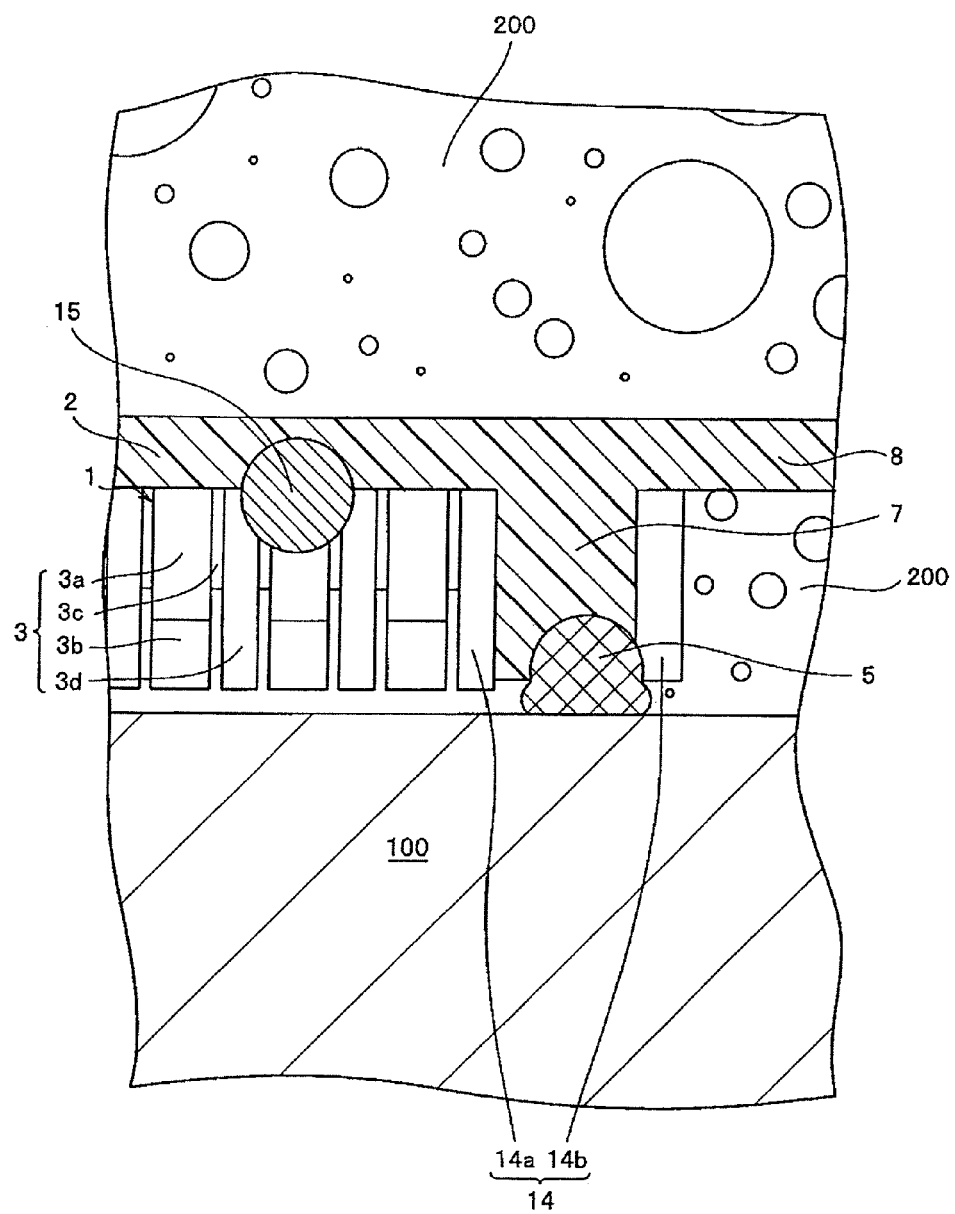
FIG. 12 is a schematic enlarged view illustrating a foamable resin invasion preventing mechanism when foam molding is performed using a foamable resin according to the modification.

Since the linear sealing body 5 that is composed of the fiber string body is flexible and easily deformed due to pressing, when the linear sealing body 5 is nipped by the second linear sealing body nipping portion 14b and the linear sealing body support portion 7, as illustrated in FIGS. 9 and 10, the height H1 of the top surface of the linear sealing body 5 that is composed of a twist string is set to be higher than the height H2 of the second linear sealing body nipping portion 14b from the base member 2. As illustrated in FIG. 12, the absorption area of the linear sealing body 5 with respect to the foaming mold 100 is increased using the deformation of the portion having the large width in the horizontal direction of the linear sealing body 5 due to the absorbing force of the surface fastener 1 with respect to the absorbing surface of the foaming mold 100, and sealing performance is improved. The decrease in the magnetic force when the linear sealing body 5 is composed of a fiber string does not affect the actual performance, which is proved by the inventors through the experiments.

The external wall 6 of the second embodiment is excluded, constituent members of a die wheel for molding the surface fastener to be described below are decreased, and management easiness is improved. The linear magnetic member 15 is integrally supported at the same time as the molding of the surface fastener 1 by the linear sealing body support portion 7 connecting the base portions of the first and second linear sealing body nipping portions 14a and 14b and the first and second linear sealing body nipping portions 14a and 14b, and a nipping force is further improved.

Figure 13:
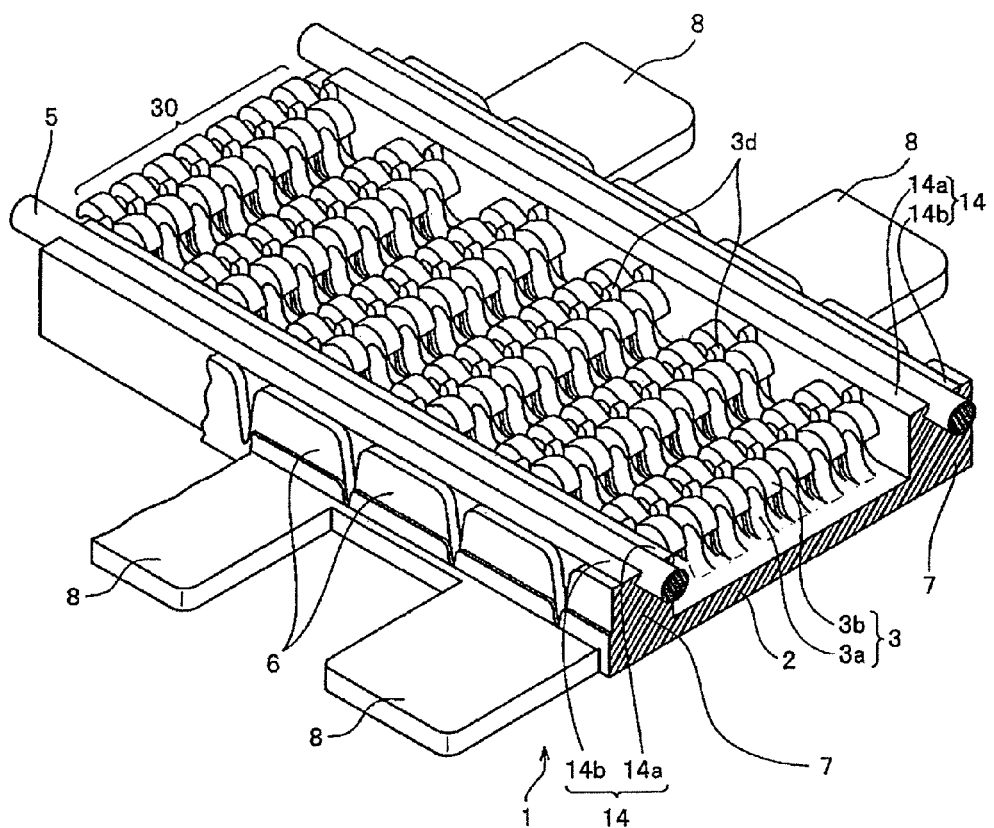
FIG. 13 is a partial perspective view illustrating a state where a molded male surface faster according to a third embodiment of the present invention is partially broken, when viewed from an upper side.

FIG. 13 illustrates a third embodiment of the present invention. In this embodiment, the first and second linear sealing body nipping portions 14a and 14b and the linear sealing body support portion 7 are divided in the longitudinal direction of the base member 2, but are continuous. The other configuration is substantially the same as that in the first embodiment. The functions and effects are substantially the same as those in the first embodiment, except that the linear sealing body 5 is firmly fixed to the resin invasion preventing wall 4. In the description below, the production name and the reference numerals are not particularly changed. In this embodiment, in the configuration of the surface fastener 1, the die wheel structure for molding the surface fastener can be simplified, and is economically advantageous. The previously molded linear sealing body is not integrally fixed to the surface fastener. As illustrated in FIG. 14B to be described in detail below, the liquid is directly flown to mold the linear sealing body, and the liquid leakage is not generated.

FIGS. 14A to 14G illustrate modifications of the linear magnetic body and the arrangement of the linear magnetic body.

Figure 14A:
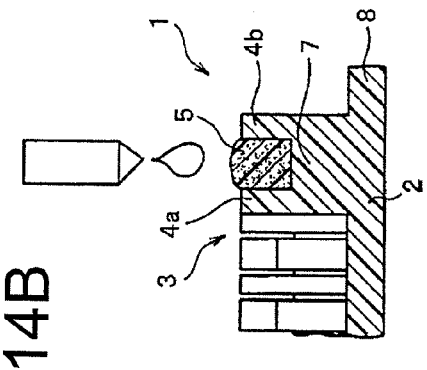
FIGS. 14A to 14D are partial cross-sectional views of molded male surface fasteners according various modifications of a linear sealing body in the present invention.
Figure 14B:
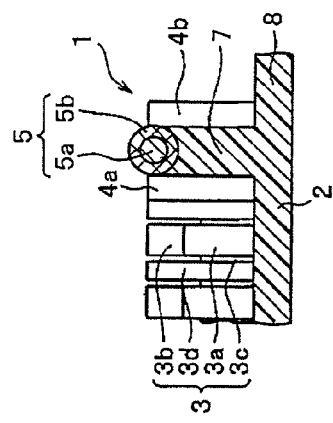

In the modification that is illustrated in FIG. 14A, the engaging portions are not formed in the upper ends of the first and second linear sealing body nipping portions 4a and 4b, different from the above-described embodiments, and the linear sealing body 5 where the peripheral surface is coated by the plurality of fiber string bodies 5' using the metal line member 5" composed of the magnetic material such as the metal or the magnet as the core member is adhered and fixed to the facing surfaces of the linear sealing body support portion 7 and the first and second linear sealing body nipping portions 4a and 4b by means of an adhesive. The adhesive is not necessarily needed. For example, the linear sealing body may be introduced at the same time as the molding of the surface fastener using the die wheel to be described in detail below. According to the modification illustrated in FIG. 14B, the synthetic resin containing the heated and melted magnetic material is flown into the linear space formed by the first and second linear sealing body nipping portions 4a and 4b and the linear sealing body support portion 7, and the linear sealing body 5 is formed in the space between the first and second linear sealing body nipping portions 4a and 4b and the linear sealing body support portion 7.

The linear sealing body in this invention includes a type where the resin described above with reference to FIG. 14B is directly flown. A type where the previously manufactured linear sealing body is fixed to the molded male surface fastener is preferable in terms of the manufacturing process.

Figure 14C:
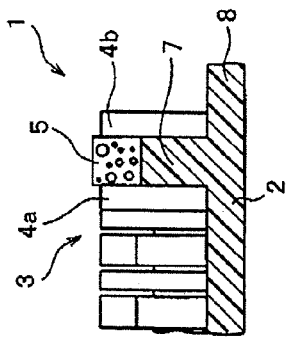
Figure 15:
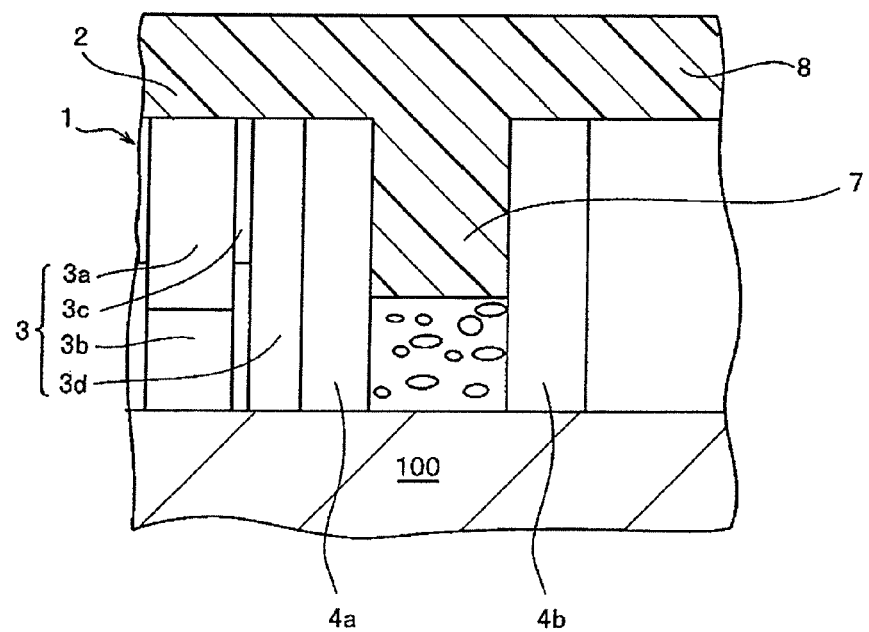
FIG. 15 is a lateral cross-sectional schematically illustrating a cohesive state in a foaming mold of the molded male surface fasteners according to the modifications illustrated in FIG. 14C.

The modification of FIG. 14C uses the foamable resin or the foamable rubber where the magnetic material is mixed as the material of the linear sealing body 5. In this modification, particularly, since the sealing property is improved using the elastic deformation of the foamable resin or the foamable rubber, similar to the second embodiment, the height of the top surface of the linear sealing body 5 is set to be more than the height of the first and second linear sealing body nipping portions 4a and 4b from the surface of the base member and the height of the top of the engaging head of the engaging element 3 from the surface of the base member. Similar to the linear magnetic body illustrated in FIG. 14A, the linear sealing body 5 is adhered and fixed between the first and second linear sealing body nipping portions 4a and 4b and the linear sealing body support portion 7 by means of the adhesive, or fixed to the melting resin of the molded male surface fastener, as seen from the method of manufacturing the molded male surface fastener to be descried in detail below. When the surface fastener 1 is absorbed in the mold by the magnet (not illustrated) that is disposed in the foaming mold 100, the linear sealing body 5 that is composed of the foamable resin or the foamable rubber is elastically deformed. As illustrated in FIG. 15, since the top surfaces of the first and second linear sealing body nipping portions 4a and 4b are closely adhered to the inner surface of the foaming mold 100, the function of the resin invasion preventing wall 4 and the sealing performance can be sufficiently realized at the time of foam molding.

The linear sealing body nipping portions 4a to 4c regulate the deformation of the linear sealing body 5 to some degrees, different from the modification of the type of FIG. 14C. In particular, since the linear sealing body 5 is formed to be completely accommodated between the linear sealing body nipping portions 4a to 4c, an optimal contact pressure can be secured.

The width of the sealing portion exposed between the linear sealing body nipping portions 4a to 4c is preferably not less than 0.5 mm and less than 3 mm. By setting the range, even though the molded male surface fastener 1 is absorbed into the foaming mold 100 by the magnet 102, the worker can simply adjust a position. If the seal width is less than 0.5 mm, the sealing property is lowered. If the seal width is not less than 3 mm, by means of a friction force between the molded male surface fastener 1 and the foaming mold 100, the position adjustment is difficult, and it is not preferable.

In this case, since the range between the linear sealing body nipping portions 4a to 4c indicates an interval range of the pair of linear sealing body nipping portions 4a to 4c that nip one linear sealing body, the linear sealing body nipping portions may be intermittent or continuous.

Figure 14D:
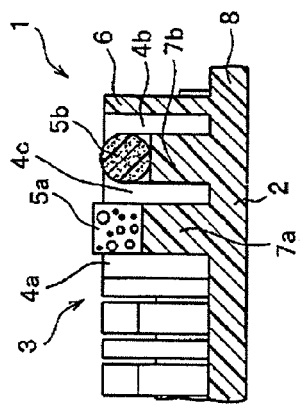

In the modification illustrated in FIG. 14D, the third linear sealing body nipping portion 4c is additionally provided between the first and second linear sealing body nipping portions 4a and 4b. Between the first and third linear sealing body nipping portions 4a and 4c and between the second and third linear sealing body nipping portions 4b and 4c, the first and second linear sealing body support portions 7a and 7b are provided. The first linear sealing body 5a is disposed between the first and third linear sealing body nipping portions 4a and 4c and the first linear sealing body support portion 7a, and the second linear sealing body 5b is disposed between the second and third linear sealing body nipping portions 4b and 4c and the second linear sealing body support portion 7b. That is, in this modification, the two linear sealing bodies 5a and 5b are disposed in parallel to each other to improve the magnetic force, and an absorbing force with respect to the mold (not illustrated) is secured.

Figure 16:
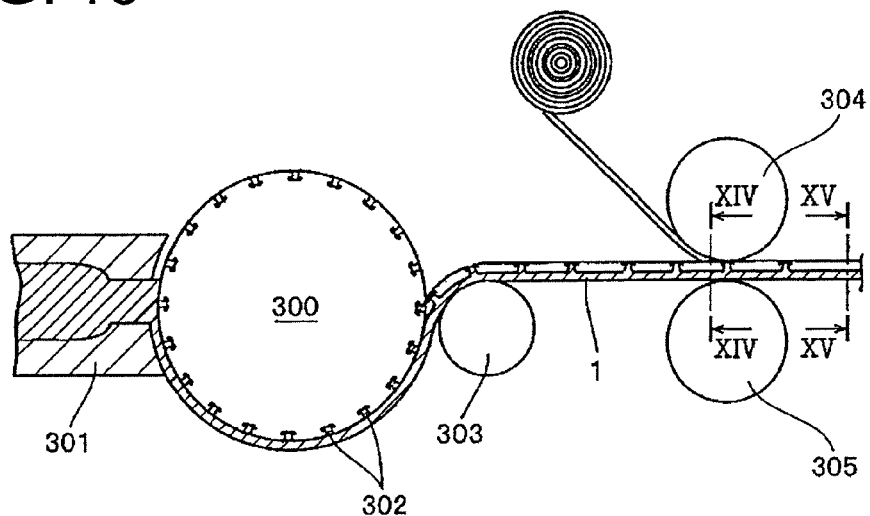
FIG. 16 is a process view illustrating a portion of an example of a molding process of a molded male surface fastener according to the present invention.
Figure 19:
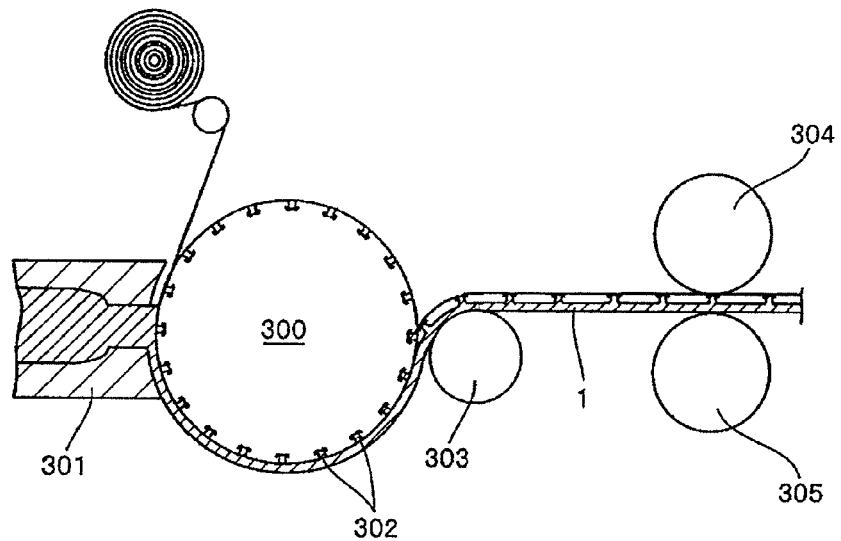
FIG. 19 is a process view illustrating a portion of another example of a molding process of a molded male surface fastener according to the present invention.

The surface fastener 1 according to the present invention that has the above configuration can be variously transformed, in addition to the examples illustrated in FIGS. 1 to 14, and the structure can be manufactured by a manufacturing apparatus illustrated in FIGS. 16 and 19. This will be described in brief below.

First, according to the manufacturing apparatus illustrated in FIG. 16, a continuous extrusion nozzle 301 made of a melting resin material is provided to face the peripheral surface of a die wheel 300 that is driven and rotated in one direction. In a central region of the peripheral surface of the die wheel 300, cavities 302 for molding plural male engaging elements are formed. In edge portions of the peripheral surface in an axial direction, plural rows of cavities (not illustrated) for molding the nipping portions that extend in a peripheral direction and are used to mold the first and second linear sealing body nipping portions 4a and 4b are intermittently or continuously formed. Meanwhile, a pick-up roll 303 is disposed on the upstream side of a rotation direction of the peripheral surface position of the die wheel 300 that is disposed at the position facing the extrusion nozzle 301, and a pair of upper and lower pressing rolls 304 and 305 are disposed on the downstream side from the pick-up roll 303. The upper pressing roll 304 has a heating portion (not illustrated) formed therein, and the heating portion heats the upper pressing roll 304 up to the required temperature.

In an obliquely upward direction of the upstream side of the pair of upper and lower pressing rolls 304 and 305, a continuous supply portion of the linear sealing body 5 is provided. The linear sealing body 5 is supplied to a surface fastener introducing portion between the pair of upper and lower pressing rolls 304 and 305 in synchronization with the rotation speed of the pair of upper and lower pressing rolls 304 and 305, and joined with the surface fastener 1. At this time, the linear sealing body 5 is fit between the first and second linear sealing body nipping portions 4a and 4b of the surface fastener 1.

The melting resin material that is extruded from the continuous extrusion nozzle 301 continuously molds the surface fastener 1 including the above-described structure by the peripheral surface according to the rotation of the die wheel 300. If the surface fastener 1 that is molded on the peripheral surface of the die wheel 300 is carried in the peripheral surface of the die wheel 300 and is half-turned, the surface fastener 1 is picked up while being continuously separated from the peripheral surface of the die wheel 300 by the pickup roll 303. The surface fastener 1 that is picked up is introduced between the pair of upper and lower pressing rolls 304 and 305. Although not illustrated, a cooling liquid passes through the inside of a lower half portion of the die wheel 300, and a cooling tank that immerses the lower half portion of the die wheel 300 is provided.

Figure 17:
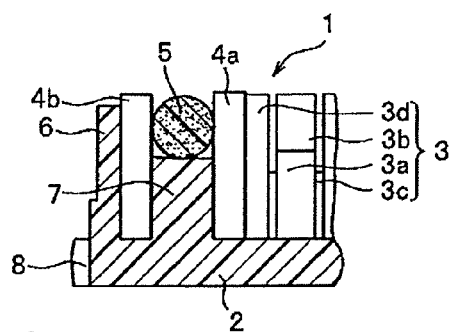
FIG. 17 is a cross-sectional view taken along the line XIV-XIV of FIG. 16.
Figure 18:
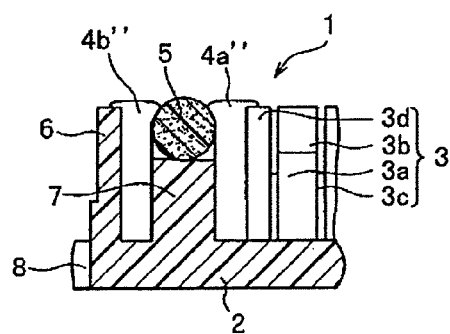
FIG. 18 is a cross-sectional view taken along the line XV-XV of FIG. 16.

If the surface fastener 1 and the linear sealing body 5 is joined with each other through the space between the pair of upper and lower pressing rolls 304 and 305, as illustrated in FIG. 16, the linear sealing body 5 is pressed between the first and second linear sealing body nipping portions 4a and 4b of the surface fastener 1 by means of the pair of upper and lower pressing rolls 304 and 305. At the same time, the upper ends of the first and second linear sealing body nipping portions 4a and 4b are heated and pressed by the upper heating and pressing roll 304, the upper ends are elastically deformed as illustrated in FIGS. 17 and 18, engaging portions 4a" and 4b" are formed in the upper ends of the first and second linear sealing body nipping portions 4a and 4b, and the linear sealing body 5 is nipped and supported between the first and second linear sealing body nipping portions 4a and 4b and the linear sealing body support portion 7. In the manufacturing apparatus of the surface fastener, different from a manufacturing method of FIG. 19 to be described in detail below, the linear sealing body support portion 7 below the linear sealing body 5 can be intermittently formed, and the molded male surface fastener having a high flectional property in the longitudinal direction can be molded.

FIG. 19 illustrates an example of another manufacturing apparatus of the surface fastener 1 according to the present invention. According to the manufacturing apparatus of the surface fastener, from the upstream side of the rotation direction of the die wheel 300, the linear sealing body 5 is introduced between the facing surfaces of the die wheel 300 and the continuous extrusion nozzle 301. That is, in the manufacturing apparatus, the linear sealing body 5 is directly supplied between cavities (not illustrated) for molding the nipping portions to mold the first and second linear sealing body nipping portions 4a and 4b of the peripheral surface of the die wheel 300, and the various surface fasteners 1 having the above configuration are integrally molded by the peripheral surface of the die wheel 300. After the surface fastener 1 that is molded on the die wheel 300 is picked up by the pick-up roll 303, the manufacturing apparatus forms engaging portions 4a" to 4c" that are engaged with the linear sealing body 5 in the end portions of the first to third linear sealing body nipping portions 4a to 4c through the pair of upper and lower pressing rolls 304 and 305, similar to the manufacturing apparatus of the surface fastener 1 illustrated in FIG. 14D.

When the surface fastener of the type illustrated in FIGS. 14A and 14C that do not need to the engaging portions 4a" to 4c" is manufactured, the pressing rolls 304 and 305 are not particularly needed. When the surface fastener of the type of FIG. 14C is manufactured, a mechanism for introducing a liquid or melt sealing member may be provided, instead of the pressing rolls 304 and 305.

The method that molds and integrates the surface fastener 1 according to the present invention manufactured in the above-described way with a cushion body (not illustrated) made of the foamable resin material is as illustrated in FIG. 5. After the long tape-like surface fastener 1 is cut to the required length, the engaging element forming surface of the engaging element 3 is placed in the projecting surface portion 101 of the foaming mold 100 corresponding to the recess of the cushion body. In the projecting surface portion 101 of the mold, the magnet 102 is buried. If the surface fastener 1 is placed in the projecting surface portion 101, the surface fastener 1 is attracted through the linear sealing body 5 by means of the attracting force of the magnet 102, and automatically absorbed and fixed at the desired posture along the projecting surface portion 101.

In this case, the foamable resin material is injected into the mold and diffuses into the entire surface of the mold while flowing into the rear surface of the surface fastener 1 and the peripheral portion of the external wall 6 or the second linear sealing body nipping portion 4b, and the foaming starts. At this time, the surface fastener 1 is positioned and fixed by the attraction action of the magnet 102 of the foaming mold 100, and does not change the position depending on the flow of the foamable resin material and the foaming pressure. As described above, the flowing foamable resin material is invaded into the forming region 30 of the engaging elements 3 through the gap formed between the first to third linear sealing body nipping portions 4a to 4c, the linear sealing body support portion 7, and the external wall 6 of the surface fastener 1. However, the foamable resin material is blocked by the first to third linear sealing body nipping portions 4a to 4c and the linear sealing body 5. Finally, the foamable resin material is not reached to the engaging element forming region, and is foamed and solidified.

The invention claimed is:

1. A male surface fastener, comprising:
   a flat base member having front and rear surfaces and made of a thermoplastic resin;
   invasion preventing walls, which prevent an invasion of a material, on surfaces of right and left edge portions along a longitudinal direction of the flat base member;
   a plurality of male engaging elements integrally provided on a surface of the flat base member between the left and right invasion preventing walls; and
   a linear sealing body that is made of a material different from materials of the flat base member and the male engaging elements and has a sealing property,
   wherein each of the invasion preventing walls comprises a first linear sealing body nipping portion and a second linear sealing body nipping portion that are integrated with the flat base member along the longitudinal direction of the flat base member and that extend in parallel, and wherein the linear sealing body extends along the longitudinal direction between top portions of the first and second linear sealing body nipping portions.

2. The male surface fastener according to claim 1, wherein the linear sealing body comprises a material at least on a surface thereof, the material having flexibility more than that of the materials of the flat base member and the male engaging elements.

3. The male surface fastener according to claim 1, wherein the linear sealing body is continuously exposed between the first and second linear sealing body nipping portions, and a height of an exposed surface of the linear sealing body from the surface of the base member is set to be equal to a height of the top surface of the male engaging element or higher than the height of a top surface thereof.

4. The male surface fastener according to claim 1, wherein the linear sealing body is completely accommodated between the first and second linear sealing body nipping portions.

5. The male surface fastener according to claim 1,
wherein the first and second linear sealing body nipping portions are intermittently disposed along the longitudinal direction of the base member.

6. The male surface fastener according to claim 5, further comprising:
external walls that are intermittently disposed on the surface of the base member along an outside edge of the second linear sealing body nipping portion to close each gap formed in the longitudinal direction in the second linear sealing body nipping portion.

7. The male surface fastener according to claim 1, further comprising:
a linear magnetic body that contains a material magnetically attracting or attracted in a longitudinal direction of the male surface fastener.

8. The male surface fastener of claim 1,
wherein a linear sealing body support portion that supports the linear sealing body from a lower side is disposed on the surface of the base member between the first and second linear sealing body nipping portions to intermittently protrude in the longitudinal direction of the base member.

9. The male surface fastener according to claim 1, further including:
engaging portions that engage the linear sealing body with the top portion of the first and second linear sealing body nipping portions.

10. The male surface fastener according to claim 1,
wherein the linear sealing body is a fiber string body.

11. The molded male surface fastener according to claim 10,
wherein the fiber string body has a synthetic resin line member containing magnetic particles as a core member, the magnetic particles being magnetically attracting or attracted.

12. The male surface fastener according to claim 1,
wherein the male surface fastener is molded separately and independently from a cushion body and integrated at the time of molding of the cushion body.

13. The male surface fastener according to claim 1,
wherein the material of the linear sealing body is magnetically attracting or attracted.

* * * * *

UNITED STATES PATENT AND TRADEMARK OFFICE
CERTIFICATE OF CORRECTION

PATENT NO. : 8,512,845 B2
APPLICATION NO. : 13/124879
DATED : August 20, 2013
INVENTOR(S) : Mineto Terada et al.

Page 1 of 1

It is certified that error appears in the above-identified patent and that said Letters Patent is hereby corrected as shown below:

In the Claims:

In column 20, line 8, in claim 11, delete "The molded" and insert -- The --, therefor.

Signed and Sealed this
Nineteenth Day of November, 2013

Teresa Stanek Rea
*Deputy Director of the United States Patent and Trademark Office*